United States Patent [19]

Sakane

[11] Patent Number: 5,161,860
[45] Date of Patent: Nov. 10, 1992

[54] WHEEL CAP

[75] Inventor: Katsunobu Sakane, Nishikasugai, Japan

[73] Assignee: Toyoda Gosei Co., Ltd., Nishikasugai, Japan

[21] Appl. No.: 704,045

[22] Filed: May 22, 1991

[30] Foreign Application Priority Data

Jun. 1, 1990 [JP] Japan .................. 2-145027
Jun. 1, 1990 [JP] Japan .................. 2-145028
Jun. 1, 1990 [JP] Japan .................. 2-145029

[51] Int. Cl.$^5$ ............................. B60B 7/04
[52] U.S. Cl. ..................... 301/37.42; 301/37.1; 301/108.3
[58] Field of Search ............. 301/37 R, 37 P, 37 PB, 301/37 TP, 108 R, 108 A

[56] References Cited

U.S. PATENT DOCUMENTS 4,740,038  4/1988  Okano et al. ............ 301/37 TP X
4,995,674  2/1991  Shiria et al. ................ 301/37 P

FOREIGN PATENT DOCUMENTS 0300333   1/1989  European Pat. Off. ...... 301/37 PB
61-107601  7/1986  Japan .
62-174901 11/1987  Japan .
0045201   2/1990  Japan ...................... 301/37 PB Primary Examiner—Russell D. Stormer
Attorney, Agent, or Firm—Cushman, Darby & Cushman

[57] ABSTRACT

A wheel cap includes a disk-shaped base made of resin, a plurality of resin engagers integral with the base and disposed at intervals in a circumferential direction on the rear surface of the base and protruding perpendicularly therefrom so as to be deformable in a radial direction, a head formed at the free end of the leg to engage with a wheel, and a ring-shaped metal wire holder held on an inner peripheral side of the engagers and urging the heads radially outward, wherein each head includes a space for holding the holder therein, the space being disposed on an inner peripheral side of the head and including an opening thereto for receiving the holder having a width about equal to or slightly less than the wire diameter of the holder, the dimension of holder space perpendicularly of the base is larger than the holder wire diameter so that the holder is movable in the space perpendicularly with respect to the base. Even when the wheel cap is subjected to a shock and is moved eccentrically, the holder can relieve the eccentric displacement and will not come out of the holder space via the opening because it can move in the space and the holder-receiving opening is restricted. Hence, the wheel cap is greatly inhibited from coming off the wheel.

13 Claims, 8 Drawing Sheets (PRIOR ART)

WHEEL CAP

BACKGROUND OF THE INVENTION

1. Field of the Invention

The present invention relates to a wheel cap or a hub cap made mainly of resin and installed on an automobile wheel.

2. Description of Related Art

A wheel cap has been installed on an automobile wheel mainly in order to impart decorativeness to the automobile wheel. The wheel cap has engagers that are elastically deformable and disposed on its rear surface, and the cap is installed detachably on the automobile wheel by the elastic force of the engagers.

A variety of wheel caps made mainly of resin have recently been installed on automobile wheels. However, the engagers made of resin do not produce a sufficient elastic force. Accordingly, a ring-shaped holder made of metal has been employed. With the help of the holder, the engagers are pressed and held onto the inner surface of the automobile wheel.

For instance, Japanese Unexamined Patent Publication No. 107601/1986 discloses a wheel cap as illustrated in FIG. 16. The wheel cap comprises a disk-shaped resin base 100, a plurality of engagers 101 integral with that base disposed in series at intervals in a circumferential direction on the rear surface of the base and protruding therefrom in a direction substantially parallel to the axis thereof or perpendicular to the plane of the base, and a ring-shaped holder 102 made of metal, held on an inner peripheral side of the engagers 101 and urging the engagers outward in a radial direction. In the wheel cap, the holder 102 engages with a groove 103 formed on the inner peripheral surface of the engagers 101 and urges the latter so that they are pressed against and engaged with the inner peripheral surface of a wheel 104. Thus the wheel cap is held on the wheel 104.

In the conventional wheel cap, there is anxiety and possibility that the wheel cap might come off the wheel 104 due to vibrations, shocks or the like during traveling. The wheel cap might come off the wheel when the wheel cap is moved eccentrically with respect to the wheel 104 by shocks or the like and the engagers 101 are considerably deformed. If such is the case, since the holder 102 might come out of the groove 103 of the engagers 101, and since the force exerted by the holder 102 and urging the engagers 101 might become weaker, the wheel cap might come off the wheel 104.

SUMMARY OF THE INVENTION

The present invention has been developed in order to avoid the above-mentioned anxiety and possibility. It is therefore an object of the present invention to inhibit the holder from coming off the engagers and consequently inhibit the wheel cap from coming off the wheel.

To accomplish the foregoing objective, there is provided a wheel cap made mainly of resin which includes a disk-shaped resin base, a plurality of resin engagers each including a leg and disposed at intervals on a rear surface of the base and protruding from the base in a direction generally perpendicular to the plane thereof so as to be deformable in a radial direction, a head formed at the free end of the leg to engage with a wheel, and a ring-shaped metal wire holder held on an inner peripheral side of the engagers and urging the engagers outward in a radial direction. The head includes a holder space for holding the holder therein. The holder space is disposed on the inner peripheral side of the head and includes a restricted holder-receiving opening thereto opposite the head having a width about equal to or slightly less than the wire diameter of the holder. The holder space has a dimension larger than the wire diameter of the holder in the perpendicular direction with respect to the base, so that the holder is disposed movably in the holder space in the aforesaid direction. Thus, even when the wheel cap is subjected to a shock and is moved eccentrically, the holder can relieve the eccentric displacement and will not come out of the holder space via the opening because the holder can move in the holder space as aforesaid and because of the relative dimensions of the opening width and the wire diameter of the holder. Hence, the wheel cap is greatly inhibited from coming off the wheel.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE INVENTION

First Preferred Embodiment

Figure 1:
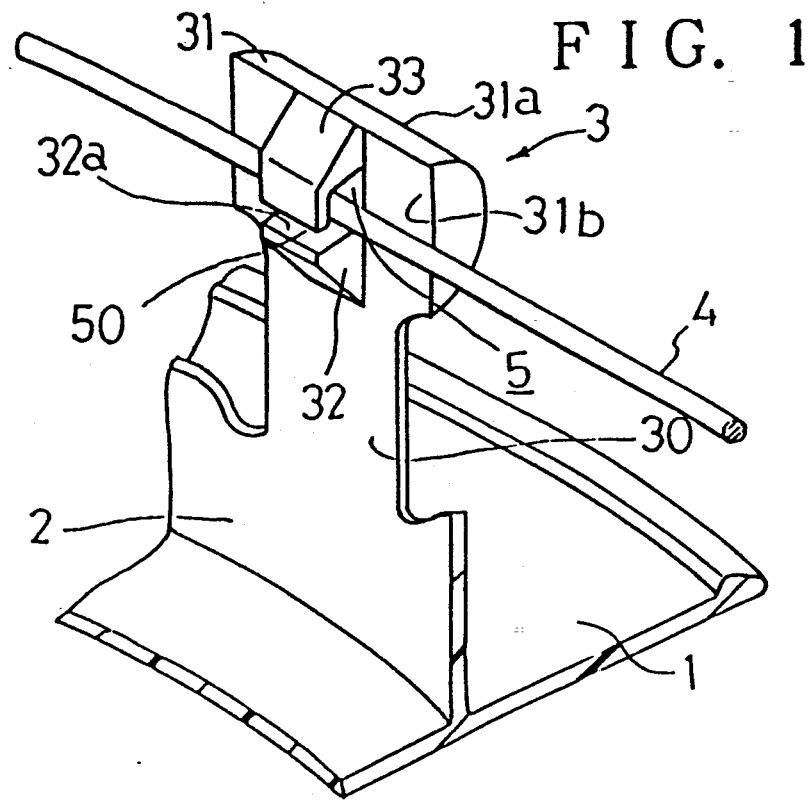
FIG. 1 is a perspective fragmentary view of a major portion of the rear surface of a wheel cap of a First Preferred Embodiment according to the present invention.

Referring now to FIGS. 1-7, there is shown a wheel cap comprising a disk-shaped base a circular rib 2 coaxially disposed adjacent to a peripheral portion of the base 1 on the rear surface or side thereof, a plurality of engagers 3 protruding from the end of the rib 2 perpendicularly with respect to the base at intervals in a circumferential direction, a plurality of holder-positioning ribs 20 disposed between the engagers 3, and a ring-shaped metal wire holder 4 held by the engagers 3. The base 1, the rib 2, the engagers 3 and the positioning ribs 20 are made integrally from a synthetic resin, such as a polypropylene resin, a glass fiber reinforced polypropylene resin, a glass fiber reinforced polyamide resin or the like, by injection molding.

Figure 2:
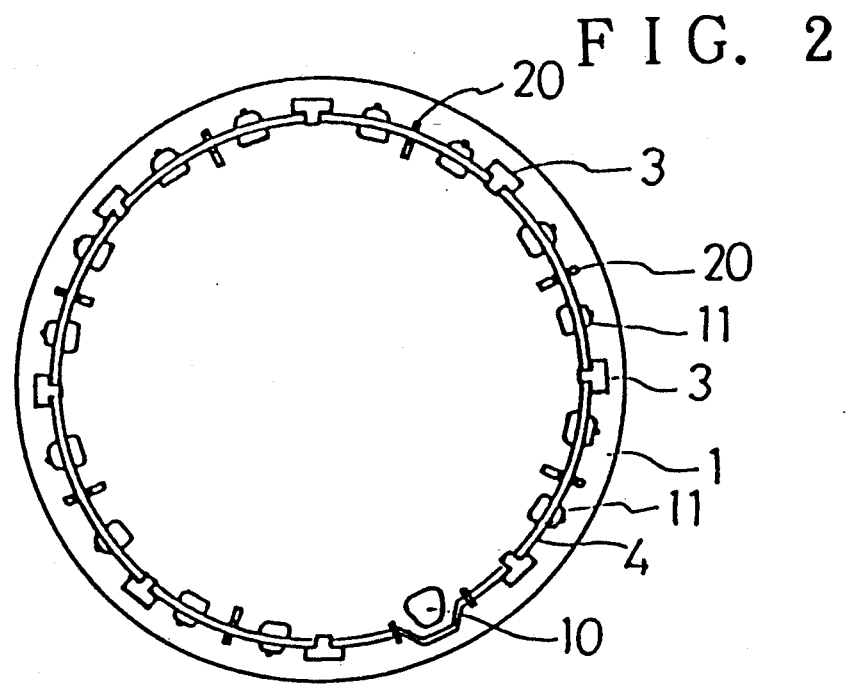
FIG. 2 is a plan view of the rear surface of the wheel cap shown in FIG. 1.
Figure 5:
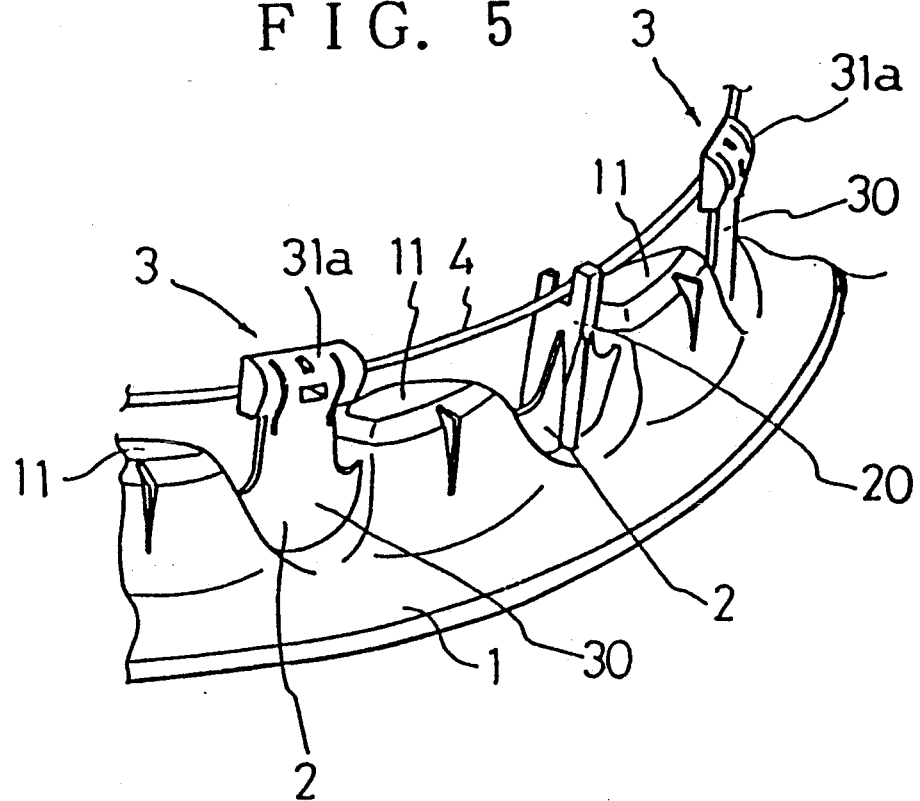
FIG. 5 is a perspective fragmentary view of a major portion of the rear surface of the wheel cap shown in FIG. 1 viewed in a different direction.

The base 1 has a valve hole 10 (FIG. 2) so as to expose a tire valve. Though not illustrated in the drawings, decorative patterns may be formed on the front surface of the base 1. Further, as illustrated in FIGS. 2 and 5, a plurality of through holes 11 having peripheral walls may also be formed in the base 1.

The positioning ribs 20 are formed between the engagers 3 so as to extend both outward and inward in a radial direction on both sides of the holder 4 which is positioned in a notch in each rib. As can be seen from FIG. 5, the positioning ribs 20 are disposed for the following purposes: To regulate the deformation and the movement of the holder 4 in a radial direction and to contact with an inner surface of a wheel 8 to position the wheel cap and inhibit it from moving eccentrically with respect to the wheel 8 when a heavy shock is applied to the wheel cap and it tries to move eccentrically with respect to the wheel 8. Further, under an ordinary installation, there is a clearance between the radially outer surface of the positioning ribs 20 and the inner surface of the wheel 8.

Eight engagers 3 are disposed and spaced equally in a circumferential direction on the rear surface of the base 1 in the First Preferred Embodiment, and each includes a thin plate-shaped leg 30 protruding from the end of the rib 2 and a thick head 31 disposed at the free end of the leg 30 (i.e. opposite the rib) and protruding radially outward thereof. The leg 30 is made elastically deformable in a radial direction. Further, a reinforcement rib (not shown) can be disposed on the head 30 in order to adjust the strength against the elastic deformation outward in a radial direction.

Figure 3:
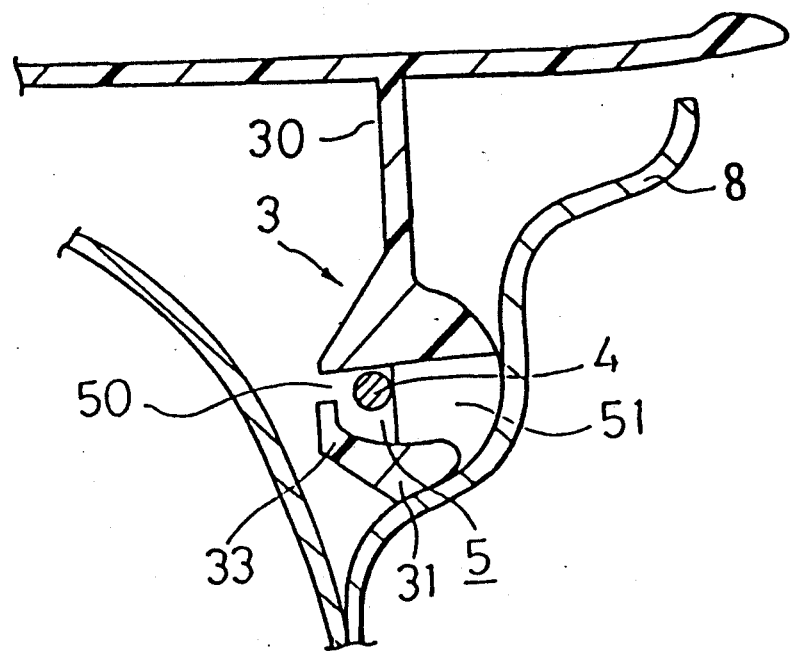
FIG. 3 is an explanatory cross-sectional view of the wheel cap shown in FIG. 1 installed on a wheel.

The head 31 is formed with a radially-outward-facing curved surface 31a which conforms to an inner peripheral surface of the wheel 8, as shown in FIG. 3. The outer surface 31a is pressed against and engaged with the wheel 8 in order to hold and fix the wheel cap on the wheel 8.

On an inner surface 31b of the head 31 opposite the outer surface 31a are spaced first and second projections 32 and 33 extending radially inward. Further, the projection 32 has a guide surface 32a substantially parallel to the rear surface of the base 1 and facing the projection 33, while the projection 33 first protrudes radially inward and then bends hook-like toward the guide surface 32a to leave a restricted opening or gap 50 therebetween. Thus, the opposed surfaces of the projections 32 and 33 radially outward of the gap 50 define a holder space 5 having a dimension perpendicular to the base 1 greater than the wire diameter of the holder 4. On the other hand, the width of the opening 50 may be about equal to or slightly less than the wire diameter of the holder 4, and it is made slightly less than the wire diameter in the First Preferred Embodiment. Additionally, the aforesaid dimension of the holder space 5 is made approximately twice s large as the wire diameter. Therefore, when the holder 4 is installed in the holder space 5, the holder 4 is movable perpendicularly with respect to the base 1. Further, a through hole 51 (FIG. 3) communicates the holder space 5 with the curved surface 31a. It is necessary to use a sliding core in the mold to form the holder space 5 during the molding of the engagers 3.

The holder 4 is made of a hard steel wire, and formed in a ring shape having a bent portion at a position corresponding to the valve hole 10, as shown in FIG. 2. The holder 4 is placed on an inner side of the head 31 of the engagers 3, pressed into the holder space 5 via the opening 50, and installed and held therein. The holder 4 presses against the inner surface 31b of the head 31 outward in a radial direction, and accordingly the leg 30 is deformed elastically so as to urge the head 31 outward in a radial direction.

The wheel cap of the First Preferred Embodiment thus constructed is installed on the wheel 8 as illustrated in FIG. 3. The engagers 3 are first put on an inner peripheral surface of the wheel 8, as shown somewhat in FIG. 4. Then, the base 12 is pressed toward the wheel 8 heavily. Accordingly, the heads 31 move along the inner surface of the wheel 8 while the legs 30 resist against the urging force of the holder 4 and deform elastically, and finally the heads 31 engage with a concave portion of the wheel 8 disposed at predetermined positions. Under the circumstance, the holder 4 is compressed inward in a radial direction, and generates a heavy spring force so as to press the heads 31 against and engage them with the inner surface of the wheel 8. When the wheel cap is displaced by a vibration or the like in the direction to come off the wheel, the holder 4 moves in the holder space 5 perpendicularly to the base 1, thereby slightly absorbing the stress due to the displacement. At the same time, since the holder 4 remains in the holder space 5 and the heads 30 of the engagers 3 are kept pressed against the wheel 8, the wheel cap is inhibited from coming off the wheel 8. Also, at this moment, since the width of the openings 50 is restricted slightly, e.g. less than the wire diameter of the holder 4, the holder 4 is further inhibited from coming out of the holder space 5 via the openings 50.

Figure 4:
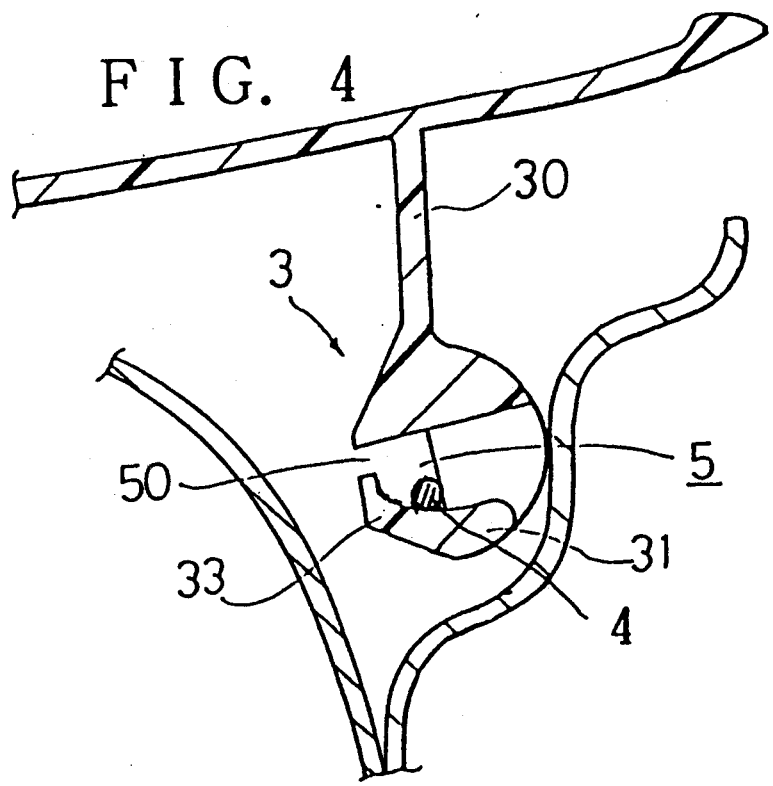
FIG. 4 is another explanatory cross-sectional view corresponding to FIG. 3 showing the condition of a displacement of the cap on the wheel.

When a large shock is applied to the wheel cap and the wheel cap moves eccentrically with respect to the wheel 8, the legs 30 deform considerably, also as illustrated in FIG. 4, and the engagers 3 try to move so as to come off the wheel 8. Under this circumstance, however, the engager 3 engages the holder 4 on the surface of the holder space 5 opposite the surface 32a. Consequently, the holder 4 is inhibited from coming off the holder space 5 via the openings 50. At the same time, the deformed holder 4 continues to press the heads 31 against the wheel 8, and accordingly the wheel cap is inhibited from coming off the wheel 8.

Modified Versions of First Preferred Embodiment

Figure 6:
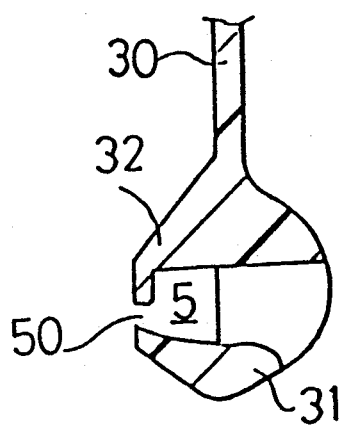
FIG. 6 is a fragmentary cross-sectional view of a modified version of an engager of the wheel cap shown in FIG. 1.
Figure 7:
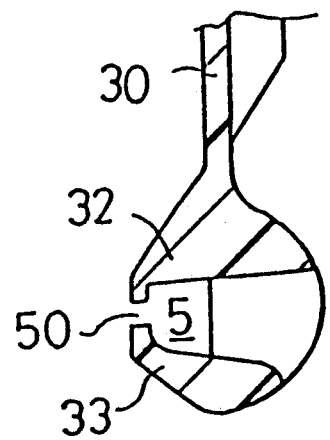
FIG. 7 is a view corresponding to FIG. 6 showing another modified version of an engager.

In the First Preferred Embodiment, the opening 50 is disposed adjacent to the leg 30, i.e. the surface 32a forms one side of the opening. However, as illustrated in FIG. 6, an end of projection 32 instead of the projection 33 can be bent in order to dispose the opening 50 more toward the end of a head 31. In addition, as illustrated in FIG. 7, the ends of both projections 32 and 33 can be bent in order to dispose the opening 50 at a central position, i.e. intermediate the ends of the holder space 5.

Second Preferred Embodiment

Returning now to FIGS. 8 through 12, the wheel cap of the Second Preferred Embodiment has constructions identical with those of the First Preferred Embodiment other than constructions of the engagers 3.

Figure 8:
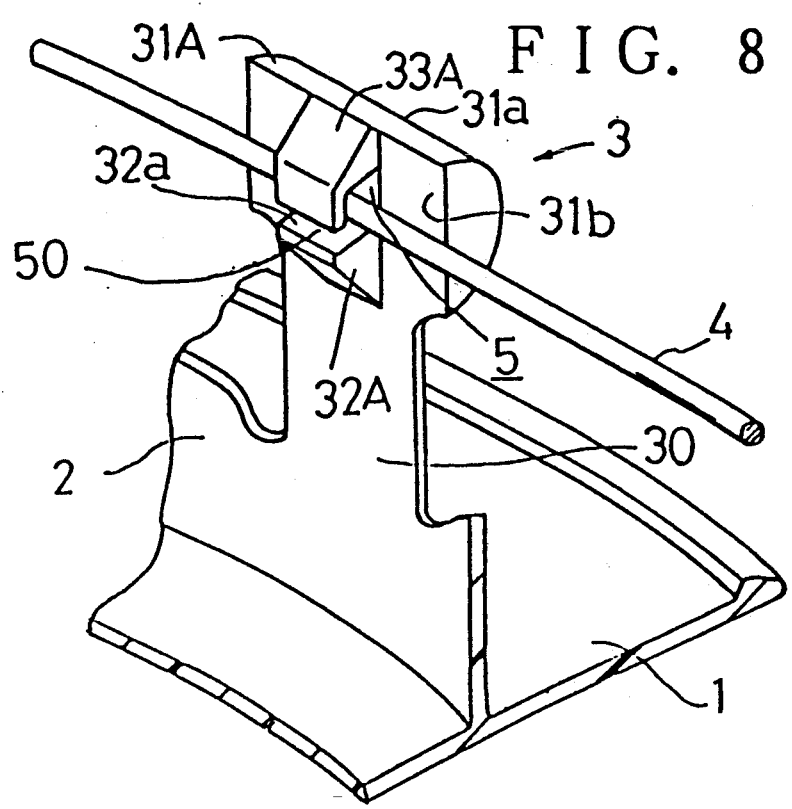
FIG. 8 is a fragmentary perspective view of a major portion of the rear surface of a wheel cap of a Second Preferred Embodiment according to the present invention.
Figure 10:
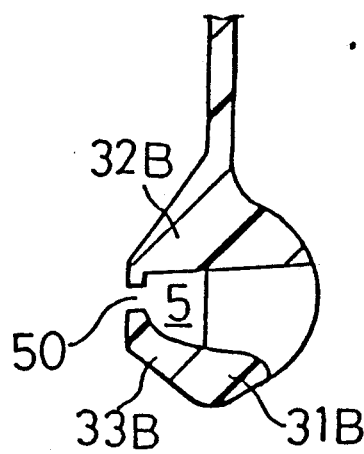
FIG. 10 is a fragmentary cross-sectional view of a modification of an engager of the wheel cap shown in FIG. 8.
Figure 11:
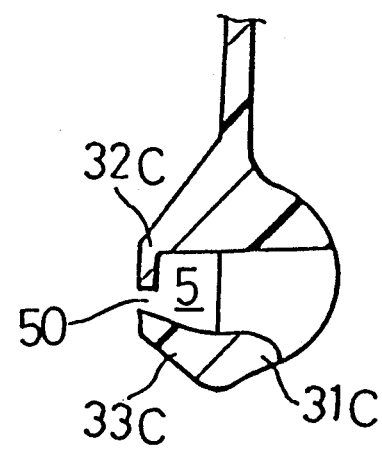
FIG. 11 is a view corresponding to FIG. 10 showing another modification of the engager shown in FIG. 10.
Figure 12:
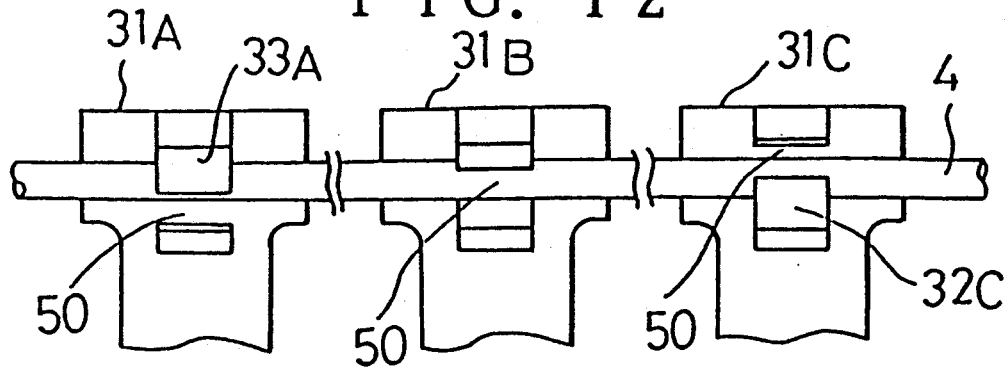
FIG. 12 is a fragmentary explanatory view of a holder held on several engagers of the wheel cap of the Second Preferred Embodiment.

As illustrated in FIG. 12, the heads have three forms 31A, 31B and 31C. Turning now to FIG. 8, on the radially inner surface 31b of one of the heads, namely the head 31A, there are first and second projections 32A and 33A defining a holder space 5 with an opening 50 like that shown in FIGS. 1, 3 and 4 wherein the surface 32a of the projection 32 forms one side of the opening or gap. Further, as illustrated in FIG. 10, the head 31B includes first and second projections 32B and 33B that define a holder space 5 with a centrally disposed opening 50 like that shown in FIG. 7, while, as illustrated in FIG. 11, the head 31C has first and second projections 32C and 33C that define a hollow space 5 with an opening 50 located like that shown in FIG. 6, i.e. adjacent the end of the head 31C.

Figure 9:
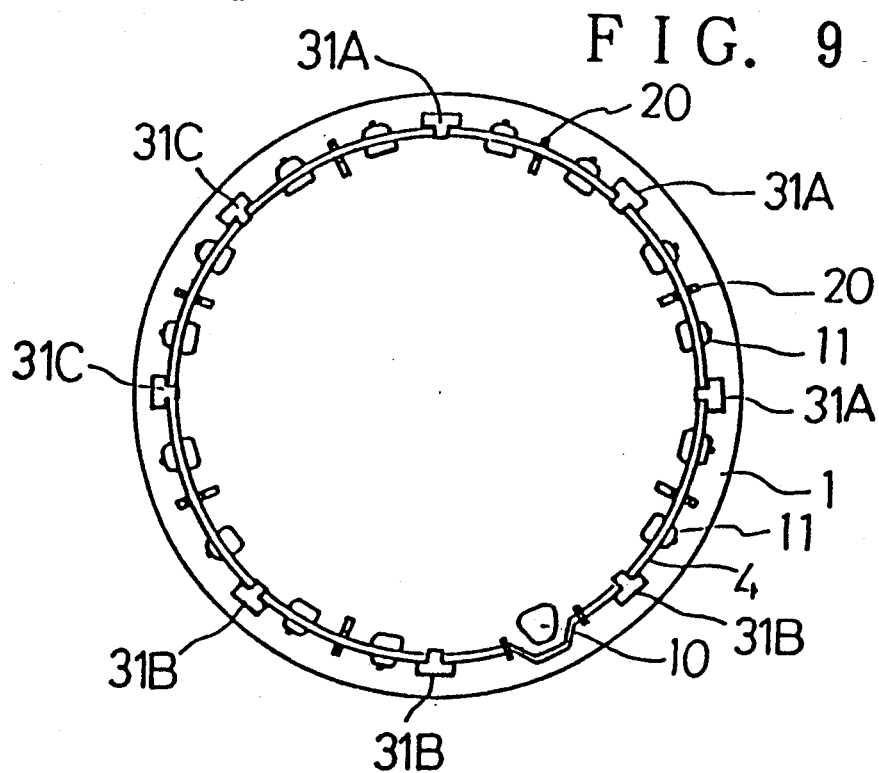
FIG. 9 is a plan view of the rear surface of the wheel cap shown in FIG. 8.

As illustrated in FIG. 9, the heads 31A, 31B and 31C are disposed so that diametrically opposite heads do not have the same form, i.e. have their openings displaced from each other perpendicularly of the base 1. Further, the heads are arranged circumferentially in a group of adjacent 31A heads, a group of adjacent 31B heads, and a group of adjacent 31C heads, in that order. The holder 4 of the Second Preferred Embodiment 1 is installed like that of the First Preferred Embodiment, i.e. by slightly deforming the engagers 3 and pressing the holder into the holder spaces 5 via the openings 50. Although the positions of the openings 50 in the heads of each group differ from those of an adjacent group, the holder 4 can be installed easily because such positions differ only slightly in adjacent groups.

The holder 4 thus installed to the engagers 3 is illustrated in FIG. 12. When the holder 4 is in the installation position, one might think that the holder 4 comes off the group of heads 31B. However, the holder 4 is inhibited from moving radially inward by hook-like bends of the projections 33A of the group of heads 31A and hook-like bends of the projections 32C of the group of heads 31C. Therefore, the holder 4 is securely inhibited from coming off the holder spaces 5 via the openings 50. Further, since the width of the openings 50 is restricted, e.g. preferably slightly less than the wire diameter of the holder 4, the holder 4 is further securely inhibited from coming out of the holder spaces 5 via the openings 50.

When a large shock is applied to the wheel cap and the wheel cap moves eccentrically with respect to the wheel 8, the legs 30 deform heavily as illustrated in FIG. 4 and the engagers 3 try to move so as to come off the wheel 8. Under this circumstance, however, the holder 4 engages one of the surfaces defining the holder spaces 5 of at least one of the heads 31A, 31B and 31C. Consequently, the holder 4 is inhibited from coming off the holder spaces 5 via the openings 50. Therefore, the holder 4 securely applies its elastic force to the heads 31, and the engagers 3 are maintained pressed against the wheel 8. Thus, the wheel cap is inhibited from coming off the wheel 8.

Third Preferred Embodiment

Figure 13:
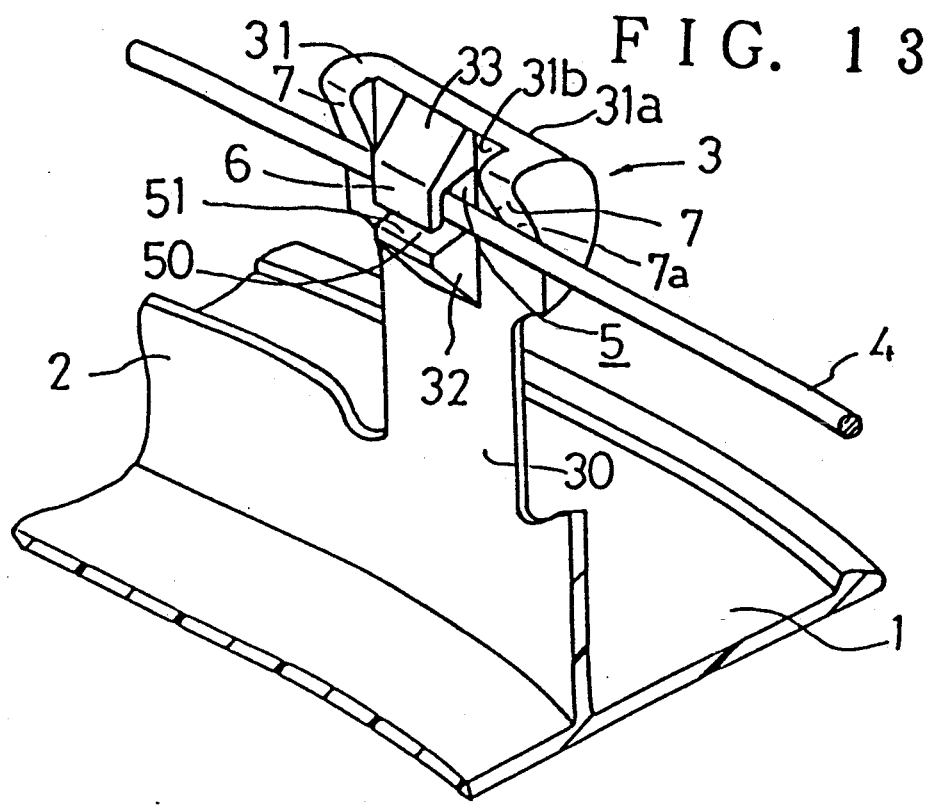
FIG. 13 is a view corresponding to FIG. 1 of a wheel cap of a Third Preferred Embodiment according to the present invention.
Figure 14:
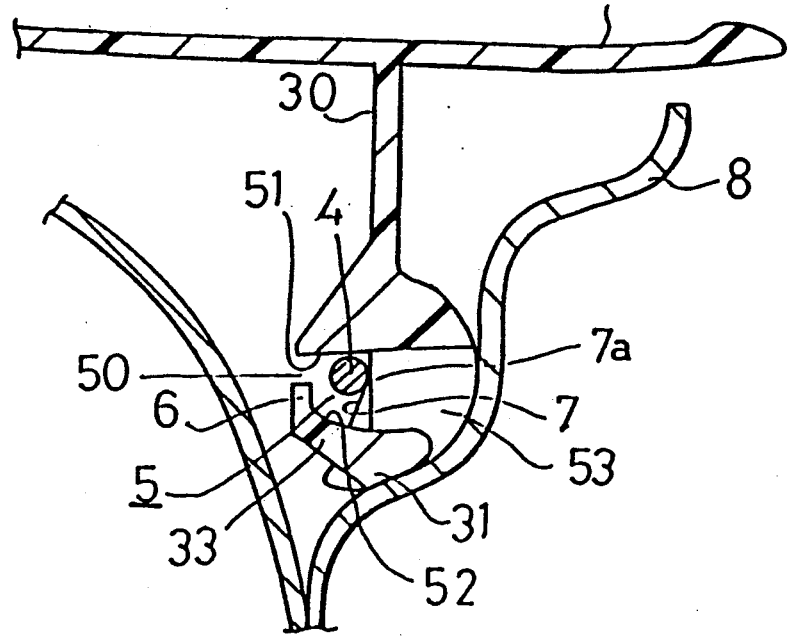
FIG. 14 is a view corresponding to FIG. 3 of the wheel cap shown in FIG. 13.
Figure 15:
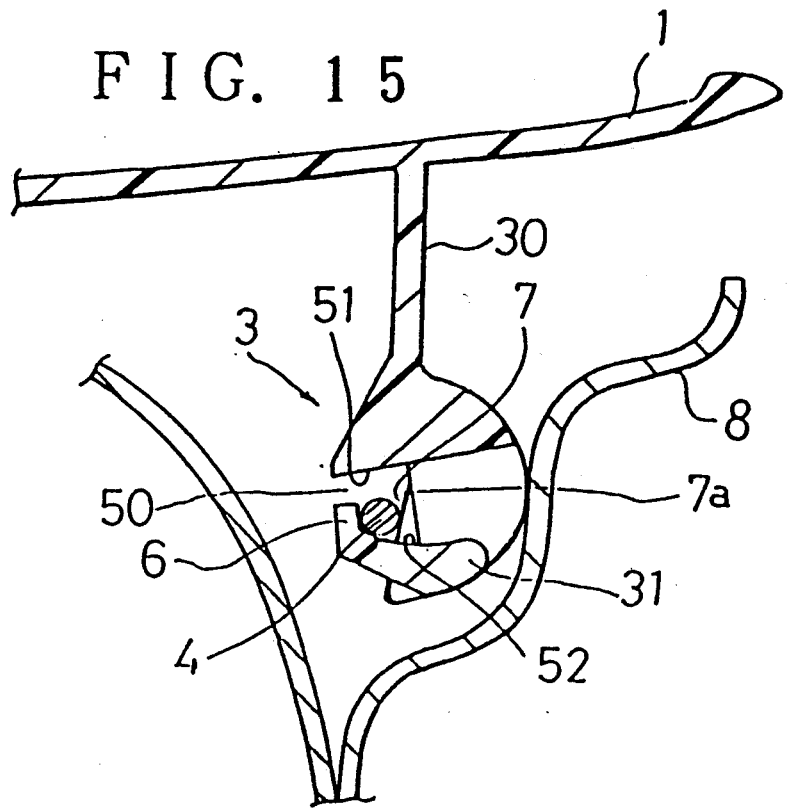
FIG. 15 is a view corresponding to FIG. 4 of the wheel cap shown in FIG. 13.
Figure 16:
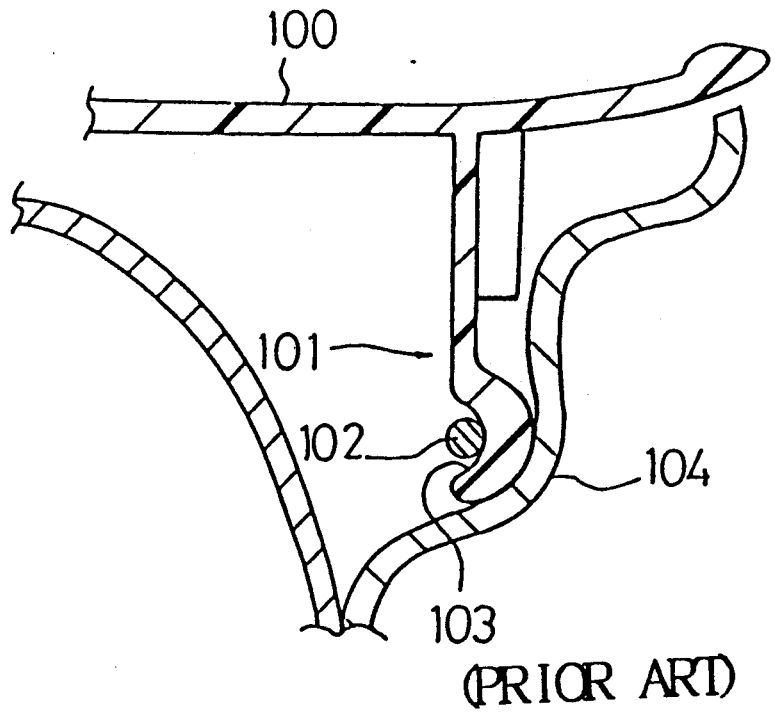
FIG. 16 is a view corresponding to FIG. 3 of a conventional wheel cap installed on a wheel.

Referring now to FIGS. 13 through 15, the wheel cap of the Third Preferred Embodiment also has constructions identical with those of the First Preferred Embodiment other than constructions of engagers 3.

As illustrated in FIG. 13, on the inner surface 31b of the head 31, there are first and second projections 32 and 33 defining a holder space 5 with an opening 50 like those shown in FIGS. 1 and 3. The width of the opening 50 is restricted to slightly less than the wire diameter of the holder. The projection 32 has a first flat regulatory surface 51 substantially parallel to the rear surface of the base 1 and the second projection 33 has a hook-like bend 6, like that shown in FIG. 3, and a second regulatory surface 52 (see FIGS. 14 and 15) opposed to and generally parallel to the first regulatory surface 51. Thus, the holder space 5 is defined by the first and second regulator surfaces 51 and 52 and has a dimension perpendicularly of the base 1 approximately twice the wire diameter of the holder. Therefore, when the holder 4 is installed, the holder 4 is movable perpendicularly with respect to the base 1. Further, as in the First Preferred Embodiment, a through hole 53 communicates the holder space 5 with the outer curved surface 31a of the head 31.

In addition, as illustrated in FIGS. 13 through 15, on each side of the projections 32 and 33, there is a sloping surface 7 which protrudes gradually radially inward as it approaches the end of the head 31.

The wheel cap of the Third Preferred Embodiment thus constructed is installed on the wheel 8 as illustrated in FIG. 14. That is, the holder 4 contacts with and presses against the sloping surfaces 7 at a position 7a adjacent to the leg 30 where the holder also substantially contacts the surface 51.

When a large shock is applied to the wheel cap and the wheel cap moves eccentrically with respect to the wheel 8, the legs 30 deform heavily as illustrated in FIG. 15 and the engagers 3 try to move so as to come off the wheel 8. Under this circumstance, however, the holder 4 moves away from the surface 50 toward the end of the head 31 and the surface 52 while being moved along the sloping surfaces 7. Therefore, the holder 4 is cammed and compressed radially inward by the sloping surfaces 7 by about a half of the height of the surfaces. Thus, the urging force of the holder 4 against the head 31 is further increased. Hence, the force pressing the head 31 radially outward is enhanced, and the force applied to the wheel 8 via the head 31 is also enhanced. As a result, the wheel cap can be greatly inhibited from coming off the wheel 8. Further, since the holder 4 cammed by the sloping surfaces 7 is held in an enclosed space surrounded by the second regulatory surface 52 and the hook-like bend 6, the holder 4 is inhibited from coming off the holder space 5 via the openings 50. Therefore, the urging force of the holder 4 is applied strongly to the heads 31, and the heads 31 of the engagers are maintained pressed against the wheel 8. Thus, the wheel cap is inhibited from coming off the wheel 8 further securely.

Having now fully described the present invention, it will be apparent to one of ordinary skill in the art, that many changes and modifications can be made thereto without departing from the spirit or scope of the present invention as set forth herein including the appended claims.

What is claimed is:

1. A wheel cap comprising:
   a disk-shaped base made of resin;
   a plurality of engagers made of resin, integral with said base, disposed in series at intervals in a circumferential direction on a rear surface of said base and protruding substantially perpendicularly therefrom so as to be deformable in a radial direction, each of said engagers including a leg and a head on a free end of said leg to engage with a wheel; and
   a ring-shaped metal retaining wire held on a radially inner peripheral side of said engagers and urging said heads radially outward,
   wherein said head includes means defining a space having spaced opposed surfaces generally parallel to said base for holding said wire movably therebetween on an inner peripheral side of said head and a radially-inward-facing opening to said space having a width substantially equal to or slightly less than the wire diameter of said wire, said space having a dimension perpendicularly of said base larger than the wire diameter of said wire, said wire being installed in said space via said opening and disposed movably in said space perpendicularly with respect to said base.

2. The wheel cap according to claim 1, wherein said opening is closer to that one of said space surfaces facing away from said base than to the other surface.

3. The wheel cap according to claim 1, wherein said head further includes a surface sloping gradually radially inward toward the end of said head, and said wire is engaged and cammed radially inward by said sloping surface when moving in said holder space toward said base.

4. The wheel cap according to claim 1, wherein at least two of said engagers have said openings disposed at positions differing from each other perpendicularly with respect to said base.

5. The wheel cap according to claim 1, wherein the openings of adjacent engagers are disposed at substantially the same position relative to their distance from said base.

6. The wheel cap according to claim 4, wherein said positions of said openings perpendicularly with respect to said base vary gradually and smoothly in said engagers along their series arrangement.

7. A wheel cap comprising:
   a disk-shaped base made of resin;
   a plurality of resin engagers integral with said base, disposed in series at intervals in a circumferential direction on a rear surface of said base and protruding substantially perpendicularly therefrom so as to be deformable in a radial direction, each of said engagers including a leg and a head formed at a free end of said leg to engage with a wheel; and
   a ring-shaped retaining wire held on the radially inner peripheral side of said engagers urging said heads radially outward,
   wherein said head includes means defining a space having opposed surfaces generally parallel to said base and spaced apart a distance greater than the diameter of said wire for holding said wire movably therebetween perpendicularly of said base on an inner peripheral side of said head and a radially-inward-facing opening to said space having a width substantially equal to or smaller than the diameter of said wire and at least two of said engagers having said openings disposed at different positions with respect to their distance from said base.

8. The wheel cap according to claim 7, wherein at least two adjacent of said engagers have said openings disposed at substantially the same positions with respect to their distance from said base.

9. The wheel cap according to claim 7 wherein said positions of said openings vary gradually and smoothly in said engagers along their series arrangement.

10. The wheel cap according to claim 7, wherein said head further includes a surface sloping gradually radially inward toward the free end of said head, and said wire is engaged and cammed radially inward by said sloping surface when moving in said wire space toward said base.

11. A wheel cap comprising:
    a disk-shaped base made of resin;
    a plurality of resin engagers integral with said base, disposed in series at intervals in a circumferential direction on a rear surface of said base and protruding substantially perpendicularly therefrom so as to be deformable in a radial direction, each of said engagers including a leg and a head formed on a free end of said leg to engage with a wheel; and
    a ring-shaped metal retaining wire held on a radially inner peripheral side of said engagers and urging said engagers radially outward,
    wherein said head includes a means defining a wire space for holding said holder movably therein perpendicularly of said base, an opening to said space for receiving said wire and opposed holder engageable regulator surfaces extending substantially parallel to said base and spaced apart a distance greater than the wire diameter of said wire, and a surface sloping gradually inward in a radial direction away from said base to engage said wire when moving in said space.

12. The wheel cap according to claim 11, wherein said head further includes a hook-like portion protruding from at least one of said regulator surfaces toward the other of said regulator surfaces, restricting said opening and facing said sloping surface.

13. A wheel cap comprising:
    a ring-shaped metal retaining wire;
    a disk-shaped base made of resin; and
    a plurality of resin engagers integral with said base to be urged radially outward by said wire and being disposed at intervals in a circumferential direction on a rear surface of said base and protruding substantially perpendicularly therefrom so as to be deformable in a radial direction, each of said engagers including a leg and a head on the free end of said leg to engage with a wheel, said head including means defining a wire space for holding said wire movably therein in a direction substantially perpendicular with respect to said base, said space being disposed on an inner peripheral side of said head and including a radially-inward-facing opening to receive said wire and having a width substantially equal to or less than the wire diameter of said wire, said space having a width larger than said wire diameter of said wire in said substantially perpendicular direction.

* * * * *